US008705664B2

(12) United States Patent
Mo et al.

(10) Patent No.: US 8,705,664 B2
(45) Date of Patent: Apr. 22, 2014

(54) SOFT-INPUT GENERATION FOR SOFT-DECISION FEC DECODING (75) Inventors: Fan Mo, Hinckley, OH (US); Sameep Dave, Hinckley, OH (US)

(73) Assignee: ViaSat, Inc., Carlsbad, CA (US)

( * ) Notice: Subject to any disclaimer, the term of this patent is extended or adjusted under 35 U.S.C. 154(b) by 200 days.

(21) Appl. No.: 13/205,435

(22) Filed: Aug. 8, 2011

(65) Prior Publication Data

US 2012/0189324 A1 Jul. 26, 2012

Related U.S. Application Data (60) Provisional application No. 61/435,278, filed on Jan. 22, 2011.

(51) Int. Cl.
H04L 27/22 (2006.01)

(52) U.S. Cl.
USPC .......................................................... 375/329

(58) Field of Classification Search
USPC .................... 375/329, 265, 316, 229, 262
See application file for complete search history.

(56) References Cited

U.S. PATENT DOCUMENTS

| 5,457,704 | A | * | 10/1995 | Hoeher et al. ................. 714/794 |
| 6,446,236 | B1 | * | 9/2002 | McEwen et al. .............. 714/795 |
| 7,251,256 | B1 | | 7/2007 | Barry et al. |
| 7,266,310 | B1 | | 9/2007 | Savory et al. |
| 8,121,220 | B1 | * | 2/2012 | Shi et al. ........................ 375/316 |
| 2004/0184487 | A1 | | 9/2004 | Kim |
| 2004/0223767 | A1 | | 11/2004 | Pappalardo et al. |
| 2006/0013590 | A1 | | 1/2006 | Hueda et al. |
| 2006/0067394 | A1 | * | 3/2006 | Chen ............................... 375/229 |
| 2006/0120475 | A1 | * | 6/2006 | Zhidkov et al. ............... 375/265 |
| 2007/0065078 | A1 | | 3/2007 | Jiang |
| 2007/0217484 | A1 | * | 9/2007 | Leiby et al. ................... 375/136 |
| 2007/0217792 | A1 | | 9/2007 | Nonaka et al. |
| 2009/0213908 | A1 | * | 8/2009 | Bottomley .................... 375/148 |
| 2009/0316754 | A1 | * | 12/2009 | Leiby et al. ................... 375/132 |
| 2010/0209121 | A1 | | 8/2010 | Tanimura |
| 2010/0232809 | A1 | | 9/2010 | Cai et al. |
| 2010/0239264 | A1 | | 9/2010 | Yang et al. |
| 2010/0329677 | A1 | | 12/2010 | Kaneda et al. |
| 2011/0064421 | A1 | | 3/2011 | Zhang et al. |
| 2012/0033965 | A1 | | 2/2012 | Zhang et al. |
| 2012/0141144 | A1 | * | 6/2012 | Cai et al. ....................... 398/202 |

FOREIGN PATENT DOCUMENTS

EP 2352239 A1 8/2011

OTHER PUBLICATIONS

International Search Report and Written Opinion dated Aug. 30, 2012, PCT/US2012/022231 to ViaSat, Inc. et al., 8 pgs.
International Search Report and Written Opinion dated Aug. 30, 2012, PCT/US2012/022234 to ViaSat, Inc. et al., 10 pgs.

(Continued)

Primary Examiner — Jaison Joseph
(74) Attorney, Agent, or Firm — Holland & Hart LLP (57) ABSTRACT A soft-decision forward error correction scheme for received optical signals is described. Differential decoding may be performed, for example, in each polarization after coherent QPSK detection. Hard decisions may be made based on judging the most likely transition between each pair of received input symbols. Soft-input generation is also described, representing the reliability of the hard decisions. The soft-input information may be generated through simplified algorithms that utilize the most likely transitions to determine a reliability assignment.

30 Claims, 9 Drawing Sheets (56) References Cited

OTHER PUBLICATIONS

International Preliminary Report on Patentability dated Aug. 1, 2013, Int'l App. No. PCT/US2012/022231 to ViaSat, Inc. et al., 5 pgs.

Non-final Office Action dated Dec. 28, 2012, U.S. Appl. No. 13/205,431 to Mo et al., 12 pgs.
Non-final Office Action dated Jul. 29, 2013, U.S. Appl. No. 13/205,431 to Mo et al., 12 pgs.

* cited by examiner

FIG. 9

SOFT-INPUT GENERATION FOR SOFT-DECISION FEC DECODING

CROSS REFERENCES

The present application claims the benefit of U.S. Provisional Patent Application No. 61/435,278, filed on Jan. 22, 2011, entitled "HIGH RATE OPTICAL COMMUNICATION," which is incorporated herein by reference in its entirety.

BACKGROUND

The present disclosure relates to systems, devices, and methods for demodulation and decoding in optical communications systems.

Fiber optic channels in network communications systems are widely deployed and are considered effective for data transmission, allowing relatively high bandwidth data communication. Optical fiber is typically flexible and can be bundled in cables. It is often used for long-distance communications, because light propagates through the fiber with little attenuation compared to electrical cables. Typical present day commercial optical fiber systems transmit data at 10 or 40 Gbps. Each fiber can carry multiple independent channels, each using a different wavelength of light in a technique known as wavelength-division multiplexing (WDM).

Increased data transmission rates may be desirable as demand for bandwidth increases. However, in fiber optic systems, as data rates increase various optical phenomena begin to manifest and act to limit data transmission rates. For example, optical effects from chromatic dispersion (CD), polarization mode dispersion (PMD), and polarization dependent loss (PDL) begin to have a significant impact on the data transmission rate. Forward error correction (FEC) schemes are often used to send redundant data to address these issues, as well as others.

Many current architectures rely on hard-decision FEC schemes. Although soft-decision FEC schemes are used effectively in other areas of communications, there are implementation and other challenges in high speed optical communications.

SUMMARY

Methods, systems, devices, and computer program products are described for soft-input generation for soft-decision FEC. A soft-decision FEC scheme for received optical signals is described. Differential decoding may be performed in each polarization after coherent quadrature phase-shift keying (QPSK) detection. Hard decisions may be made based on judging the most likely transition between each pair of received input symbols. Soft input information may also be generated representing reliability of the hard decisions. The soft input information may be generated through simplified algorithms that utilize the most likely transitions to determine a reliability assignment.

In one set of embodiments, input symbols including in-phase and quadrature components are received. Terms for calculating the reliability of transitions between the input symbols are identified. For each transition, dominating terms are identified. A reliability metric may be generated for each transition using the applicable subset of dominating terms for each respective transition.

A method for soft decision differential decoding may include receiving a plurality of input symbols each comprising in-phase and quadrature components; identifying a plurality of terms for calculating reliability of transitions between the input symbols; for each transition, identifying a subset of the plurality of terms comprising dominating terms; and generating a reliability metric for each transition using the applicable subset of dominating terms for each respective transition.

A system for soft decision differential decoding may include means for receiving a plurality of input symbols, each comprising in-phase and quadrature components; identifying a plurality of terms for calculating reliability of transitions between input symbols; identifying, for each transition, a subset of the plurality of terms comprising dominating terms; and generating a reliability metric for each transition using the applicable subset of dominating terms for each respective transition.

A device for soft decision differential decoding may include a receiver module configured to receive a plurality of input symbols each comprising in-phase and quadrature components; a dominating term identification module, communicatively coupled with the receiver module, and configured to identify a plurality of terms for calculating reliability of transitions between input symbols, and for each transition, identify a subset of the plurality of terms comprising dominating terms; and a reliability metric generation module, communicatively coupled with the dominating term identification module, and configured to generate a reliability metric for each transition using the applicable subset of dominating terms for each respective transition.

BRIEF DESCRIPTION OF THE DRAWINGS

A further understanding of the nature and advantages of embodiments of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Methods, systems, and devices are described for a soft-decision forward error correction (FEC) scheme for received optical signals. At a transmitter, data to be transmitted may be differentially encoded. This differentially encoded data may be coherently modulated using quadrature phase-shift keying (QPSK), and transmitted using optical signals. The optical signals may be received at a receiver. Differential decoding may be performed in each polarization after coherent QPSK detection. Hard decisions may be made based on judging the most likely transition between each pair of received input symbols. Soft input information may also be generated. To do so, terms are identified for calculating the reliability of transitions between input symbols. For each transition, a subset of the terms is identified as dominating terms. A reliability metric may be generated for each transition using the applicable subset of dominating terms for each respective transition.

This description provides examples, and is not intended to limit the scope, applicability or configuration of embodiments of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

Figure 1:
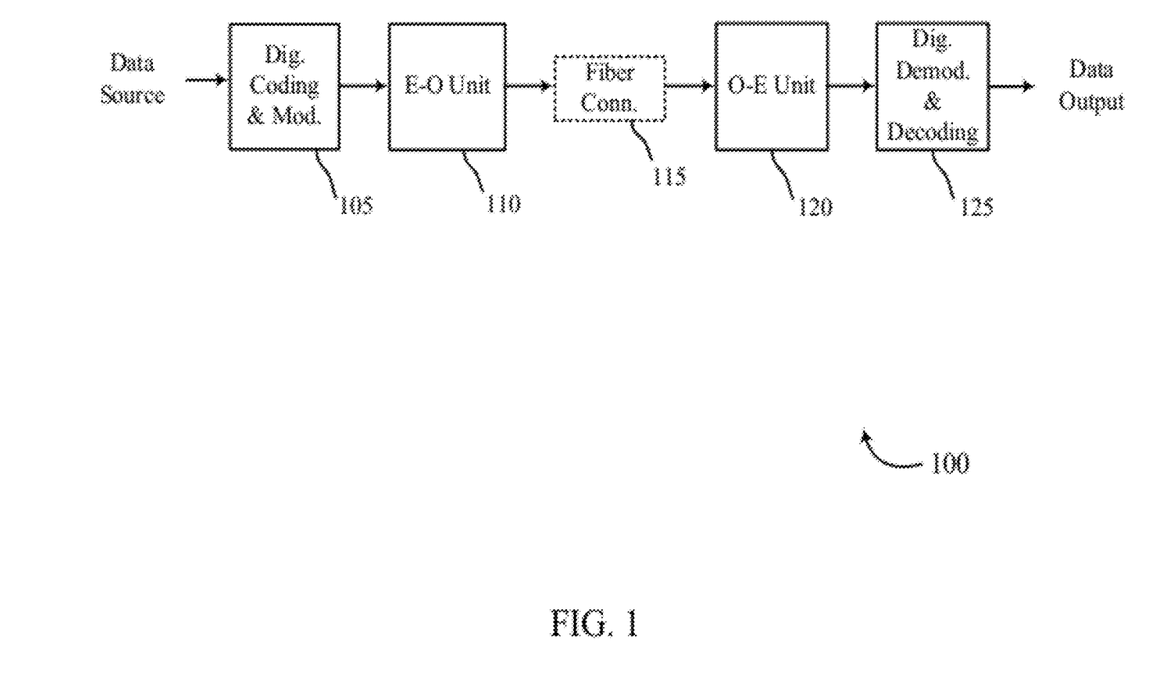
FIG. 1 is a block diagram of an optical communication system including components configured according to various embodiments of the invention.

Systems, devices, methods, and software are described for an optical communication system that utilizes fiber optic cables as a data transmission medium. An example of an optical data transport system 100 is illustrated in FIG. 1. In this embodiment, the optical data transport system 100 includes a data source that provides data to a digital coding and modulation unit 105. The data source may include any of a number of common data sources, such as a user telecommunications device, a cable operator head-end unit, a telecommunications provider central office, a computer server, or a network attached storage system, to name but a few examples. In many embodiments, the data source generates significant quantities of data to be transported across the optical data transport system 100. The digital coding and modulation unit 105 receives this data, and performs framing, forward error correction coding, and modulation functions on the data. The electrical-to-optical (E-O) unit 110 transforms the data into optical signals, and transmits optical signals containing the data via a fiber connection 115. The fiber connection 115 may include well known components of such connections, including a fiber optic cable. An optical-to-electrical (O-E) unit 120 receives the optical signal from the fiber connection 115, and transforms the data into the electrical domain. The digital demodulation and decoding unit 125 receives the digitized version of the optical signal and performs demodulation, forward error correction decoding, and de-framing functions on the data from the optical signal. Aspects of a digital demodulation and decoding unit 125 will be discussed in more detail below, as the soft-decision FEC scheme described herein may be implemented therein. The digital demodulation and decoding unit 125 may then output the data (e.g., to a user telecommunications device, a cable operator head-end unit, a telecommunications provider central office, a computer server, or a network attached storage system).

Figure 2:
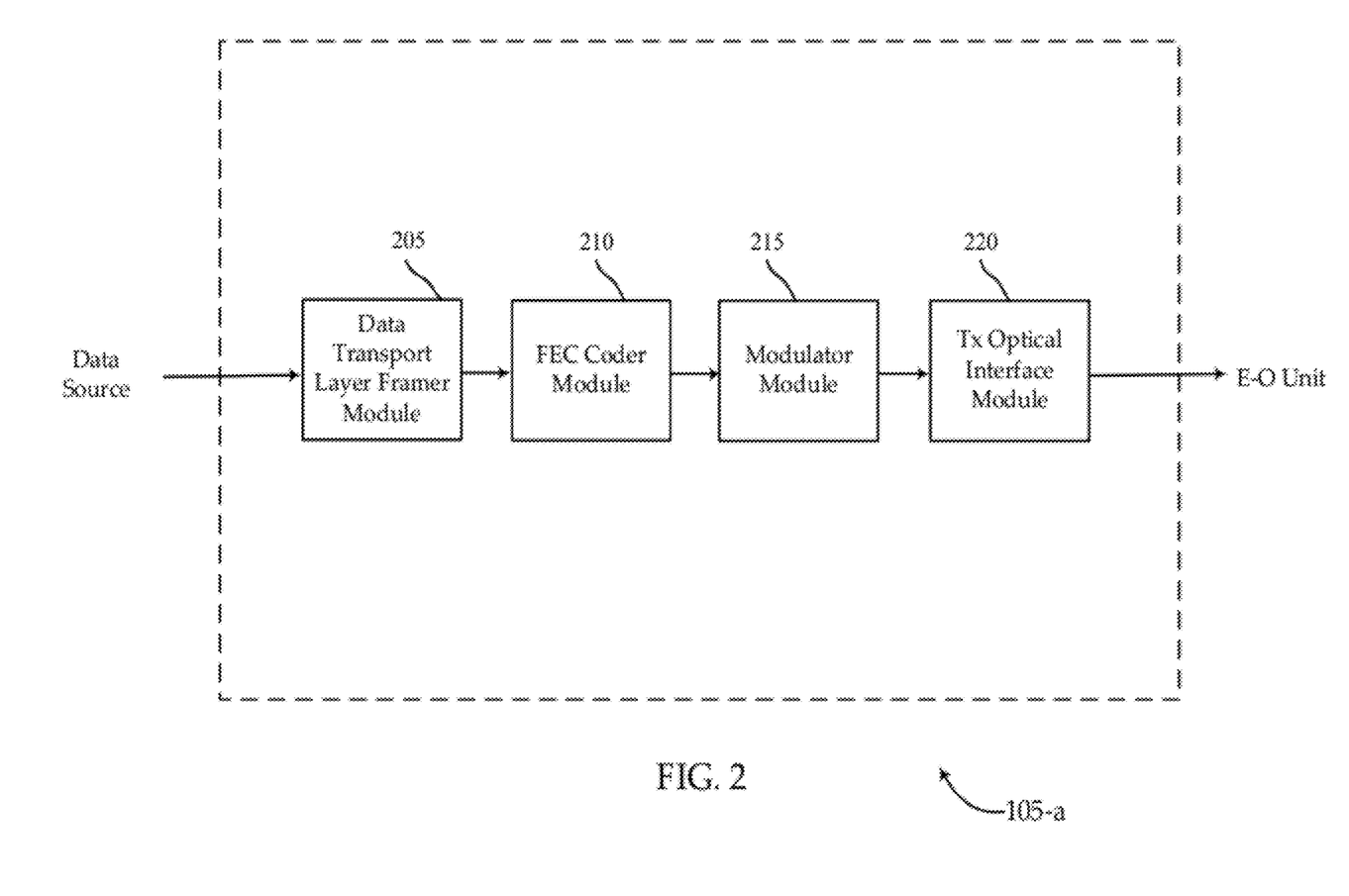
FIG. 2 is a block diagram of a digital coding and modulation unit according to various embodiments of the invention.

FIG. 2 illustrates a digital coding and modulation unit 105-*a*. In the illustrated embodiment, the digital coding and modulation unit 105-*a* includes a data transport layer framer module 205, an FEC coder module 210, a modulator module 215, and a transmitter optical interface module 220. The data transport layer framer module 205 may place the data received from the data source into packet frames for transmission. The packet frames may conform to one of many common protocols for packet frames used in optical communications systems which commonly include a header and a payload, and possibly a trailer, such as a CRC. As is well understood, the header may be interleaved with the payload during transmission, depending upon the particular protocol being used for optical transmission. The FEC coder module 210 calculates and adds forward error correction (FEC) information to the frames of data received from the data transport layer framer module 205. The particular type of FEC information of various embodiments generally includes systematically generated redundant error-correcting code (ECC) data that is transmitted along with the frames. In some examples, turbo product codes or low-density parity-check (LDPC) codes are used. There may be differential encoding used in some embodiments. The modulator module 215 modulates the frames and FEC information, forwarding the data to a transmitter optical interface module 220. The transmitter optical interface module 220 may forward the modulated data to the E-O module where it may be transmitted in the optical domain via a dual-polarity (dual-pole) QPSK modulation, resulting in four parallel optical streams. Other modulation schemes may be used in other examples, as well.

Figure 3:
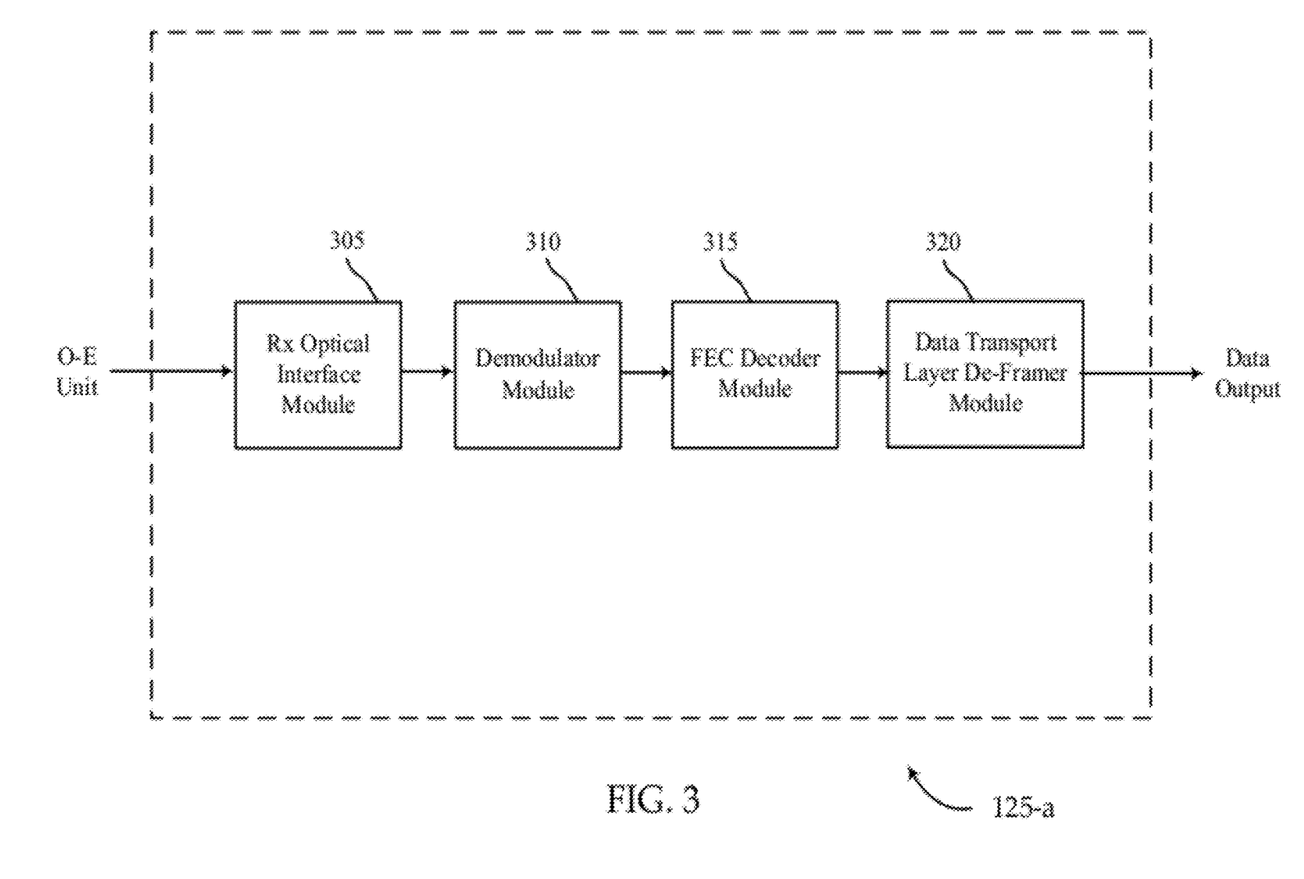
FIG. 3 is a block diagram of a digital demodulation and decoding unit according to various embodiments of the invention.

As illustrated in FIG. 3, a digital demodulation and decoding unit 125-*a* may include a number of modules, as well. In this embodiment the digital demodulation and decoding unit 125-*a* includes a receiver optical interface module 305, a demodulator module 310, an FEC decoder module 315, and a data transport layer de-framer module 320. The receiver optical interface 305 is the interface from the O-E unit 120. The receiver optical interface module 305 provides electrical signals to a demodulator module 310. Various embodiments of the demodulator module 310 will be discussed in further detail below. The demodulator module 310 may produce streams of in-phase and quadrature data. In some examples, the demodulator module generates hard decision data, and also generates soft input information representing reliability of the hard decisions. The soft input information may be generated through simplified algorithms that utilize the most likely transitions to determine a reliability assignment. This data may be provided to FEC decoder module 315 which decodes and may correct transmission errors identified from error-correcting code. The FEC decoder module 315 provides decoded data to the data transport layer de-framer module 320, which de-frames the data from the signal according to the particular protocol used in the optical transmission, and provides output data. The data output may be, for example, a user or any receiving system.

These components of may, individually or collectively, be implemented with one or more application specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other semi-custom ICs), which may be programmed in any manner known in the art. The functions of each unit may also be implemented, in whole or in part, with instructions embodied in a memory, formatted to be executed by one or more general or application-specific processors.

Figure 4:
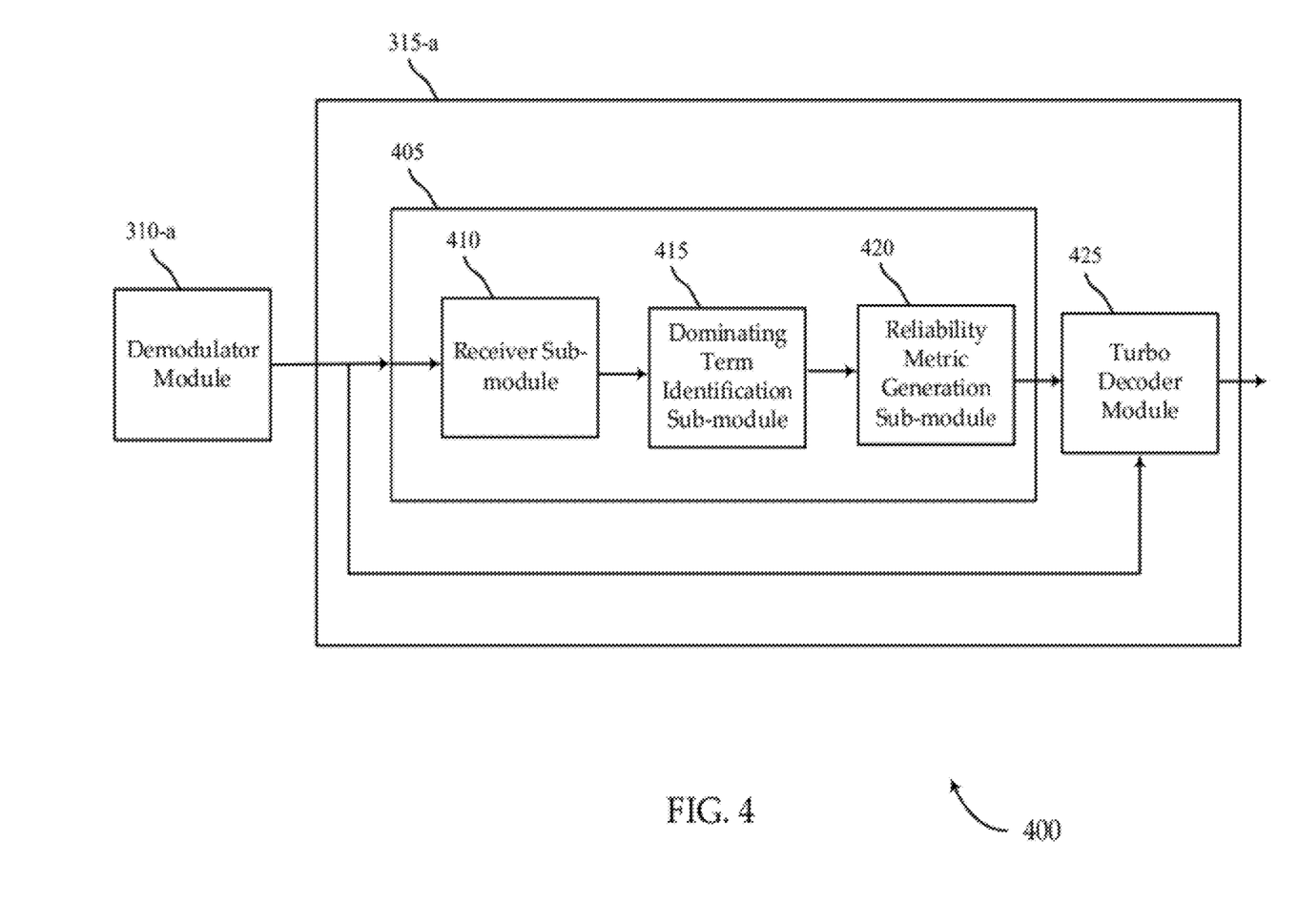
FIG. 4 is a block diagram illustrating aspects of a demodulator module and decoding module configured according to various embodiments of the invention.

Turning now to FIG. 4, an example of a demodulation and decoding system 400 is shown. The system 400 includes a demodulator module 310-*a* and a FEC decoder module 315-*a*. This may be an example of the demodulator module 310 and FEC decoder module 315 illustrated in FIG. 3. The FEC decoder module 315 may include a reliability module 405 made up of a receiver sub-module 410, a dominating term identification sub-module 415, and a reliability metric generation sub-module 420. The FEC decoder module 315 may include a turbo decoder module 425. The demodulation and decoding system 400 may be implemented in the digital demodulation and decoding unit 125 of FIG. 1 or 3.

As noted above, the demodulator module 310-*a* may receive a digitized version of a received optical communications signal (although in other embodiments, the received signal may be a digitized version of another type of communications signal, such as a satellite or other wireless signal). The received signal may be made up of four parallel streams: a horizontal in-phase stream, a vertical in-phase stream, a horizontal quadrature stream, and a vertical quadrature stream (e.g., from the receiver optical interface module). In this example, the optical communications signal has been differentially encoded at the transmitter, and modulated using QPSK. The differential encoding is employed separately on vertical and horizontal polarizations. The demodulator module 310-*a* may perform coherent differentially-encoded QPSK detection on each pole, and generate symbols for forwarding to the FEC decoder module 315-*a*. The demodulator module 310-*a* may generate hard decision data, and also generate in-phase and quadrature information that may be used downstream for soft input data.

The receiver sub-module 410 may receive the input symbols, made up of in-phase and quadrature components for a given pole. The dominating term identification sub-module 415 may identify a number of terms for calculating reliability of transitions between input symbols. These may be the terms that together can be used to calculate probability for different transitions, and thus provide the soft input that may be used to determine the reliability of the hard decisions. For each transition, the dominating term identification sub-module 415 may, in real-time, identify a subset of these terms that are the dominating terms for the calculation. To do so, the dominating term identification sub-module 415 may make a selection by evaluating relative magnitudes of in-phase and quadrature components of both input symbols involved in the transition. More specifically, the dominating term identification sub-module 415 may make decisions by identifying a smallest magnitude of: an in-phase component of a first input symbol involved in transition, a quadrature component of the first input symbol involved in a transition, an in-phase component of a second input symbol involved in transition, and a quadrature component of the second input symbol involved in a transition.

The reliability metric generation module 420 may generate a reliability metric for each transition using an applicable subset of dominating terms. The reliability metric may be a maximum likelihood ratio (e.g., LLR) calculation. The reliability metric generation module 420 may forward the generated reliability metric to the turbo decoder module 425. The hard decision data may be forwarded by the demodulator module 310-*a* to the turbo decoder module 425 for use with the reliability metric in decoding the stream from each polarization.

Figure 5:
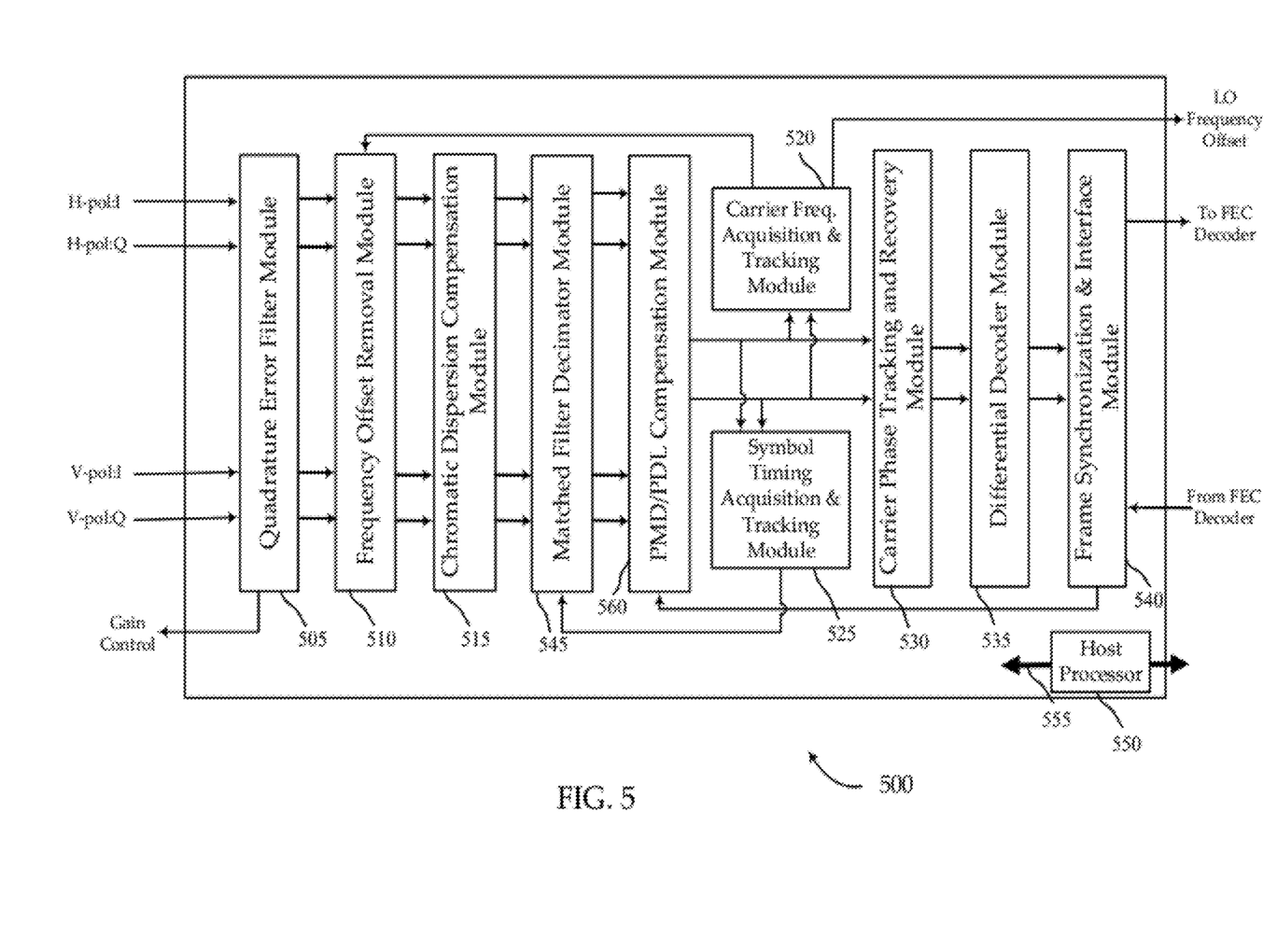
FIG. 5 is a block diagram of a digital demodulation unit according to various embodiments of the invention.

Referring now to FIG. 5, a demodulator unit 500 is described. This may be the demodulator unit 310 of FIG. 3 or 4. In this example, two polarization components are received, one horizontal component (H) and one vertical component (V). Each of the H and V components includes both an in-phase (I) component and a quadrature (Q) component. For reference, the two components in the horizontal polarization are referred to as HI (horizontal in-phase component) and HQ (horizontal quadrature component). Similarly, the two components in the vertical polarization are referred to as VI (vertical in-phase component) and VQ (vertical quadrature component). The demodulator unit 500 processes the digitized samples of the I and Q components of the two polarization components to recover the transmitted data. At the input, the demodulator unit 500 accepts the four parallel streams carrying HI, HQ, VI and VQ samples. In one embodiment, each stream contains multiple samples per clock. At its output the demodulator may provide demodulated hard-decision data with soft-decision reliability data to the FEC decoder module (e.g., FEC decoder module 315 of FIG. 3 or 4). In some embodiments, the soft-decision data need not be provided. The demodulator unit 500 may identify the beginning of a FEC frame. Additionally, in some embodiments the demodulator unit 500 receives feedback signals from the FEC decoder module 315 regarding the convergence status for error correction.

In some embodiments, the demodulator unit 500 is implemented as an application specific integrated circuit (ASIC) that includes a number of functional modules. In such embodiments, the demodulator unit 500 may have a control and monitor interface bus 555 connected to a host processor 550 allowing for configuration of demodulator parameters (filter coefficients, loop gains, etc.) and extraction of demodulator status. With continuing reference to FIG. 5, several of the sub-modules within the demodulator unit 500 of various embodiments are described. In this embodiment, a quadrature error filter (QEF) module 505 provides a collection of data formatting, error detection and correction functions. In one embodiment, input data samples are expected to be in binary-offset/offset-binary format and are converted to a two's complement (2C) format for processing within a digital signal processor. The incoming HI, HQ, VI and VQ streams, in some embodiments, also can be independently swapped and inverted if needed, allowing for any design issues that might translate into an accidental inversion or IQ swap. Each data stream of these various embodiments may be processed to remove polarization skew (between H and V poles) as well as I-Q skew within a pole. The QEF module 505 may provide for detection and removal of four types of quadrature signal errors: I/Q Skew, DC bias, I/Q amplitude imbalance, and I/Q phase imbalance. All four error detectors may be independently enabled or disabled, in some embodiments, via the processor interface, and the detected error values are output as status values via this same interface. The QEF module 505 may also output a gain control signal that may be used by other components of the system.

The QEF module 505 is connected with a frequency offset removal module 510. The frequency offset removal module 510 in one example performs a frequency rotation on the data samples coming out of the QEF module 510. The amount of frequency rotation is controlled by a frequency error input that is sourced by a carrier frequency acquisition and tracking (CFAT) module 520. Such frequency offset removal function may remove residual frequency left from the LO laser tuning in the optical domain. A chromatic dispersion compensation module 515 removes bulk chromatic dispersion from the horizontal and vertical polarization channels. The compensation may be applied via a filter in the frequency domain. The amount of correction may be controlled by the chromatic dispersion filter inputs that are derived outside of the demodulator module 500 and provided via the host processor 550 and control and monitor interface bus 555, in this embodiment.

A matched filter decimator (MFD) module 545 may implement an interpolation function that provides decimation on samples taken at two+ϵ times the symbol rate. In one embodiment, each of the four data streams has an independent bank of FIR filters with selected coefficients. The incoming data is processed through the filter banks to produce two samples per symbol for each data stream. Data samples are gathered and assembled into blocks of fixed numbers of samples per stream per clock by a sample block assembler. The assembly function may be identical for the I and Q streams in each polarization so one assembly block may service two streams. A PMD/PDL compensation module 560 may utilize adaptive equalization to compensate for cross-polarization interference, IQ channel interference, and adjacent symbol interference introduced by PMD and PDL in the optical channel and other residual impairments, such as residual chromatic dispersion as mentioned above. In one embodiment, an adaptive equalizer takes in data at one or two samples/symbols from the MFD module 545 and processes the data through a bank of FIR filters with adaptive filter tap coefficients.

In some embodiments, a symbol timing acquisition and tracking (STAT) module 525 may estimate symbol timing using an early/late symbol radius matching scheme and PI controller, and generate an error signal to correct symbol timing. This STAT module 525, in an embodiment, also has a symbol timing lock detection mechanism that outputs a symbol lock indicator. In various embodiments, there are two sets of gains for the PI controller (wide band for acquisition and narrow band for tracking). When not in timing lock, the wideband gains may be used, otherwise, the narrowband gains may be used. The STAT module 525 may perform symbol timing acquisition and tracking of a portion of the optical signal after the PMD/PDL compensation module 560 compensates for interference caused by PMD and PDL and before carrier phase recovery on the portion of the optical signal.

The CFAT module 520 may be responsible for acquiring, as well as tracking, carrier frequency. Carrier frequency acquisition is achieved using one of a number of techniques, such as through fast Fourier transform (FFT) with appropriate averaging and peak frequency component detection. The CFAT module 520 may provide a frequency error input to the frequency offset removal module 510. The CFAT module 520, in some embodiments, also provides a control output for the local oscillator (LO) frequency offset output, that may be used with data from the frame synchronization and interface module 540. A carrier phase tracking and recovery module 530 may use a feed-forward algorithm with a block phase estimator and a phase rotation function to remove residual frequency and phase errors. The carrier phase tracking and recovery module 530 may operate on the on-time data samples produced by the PMD/PDL compensation module 560. A differential decoder module 535 may be responsible, in various embodiments, for accepting symbol streams from the carrier phase tracking and recovery module 530 (e.g., at 1 sample per symbol). The differential decoder module 535 may be configured to differentially decode the signal and provide the decoded output (e.g., a hard-decision output data stream without soft-decision data, or a hard-decision output data stream with soft-decision data) to the frame synchronization and interface module 540. The frame synchronization and interface module 540 processes data to achieve frame synchronization, and may include functional blocks for data alignment, frame sync detection, and clock transfer. The frame synchronization module may be configured to skew, swap, and rotate received channels with respect to each other. The frame synchronization and interface module 540 may provide I and Q streams in each polarization to a FEC decoder module (e.g., of FEC decoder module 315 of FIG. 3 or 4.

Figure 6:
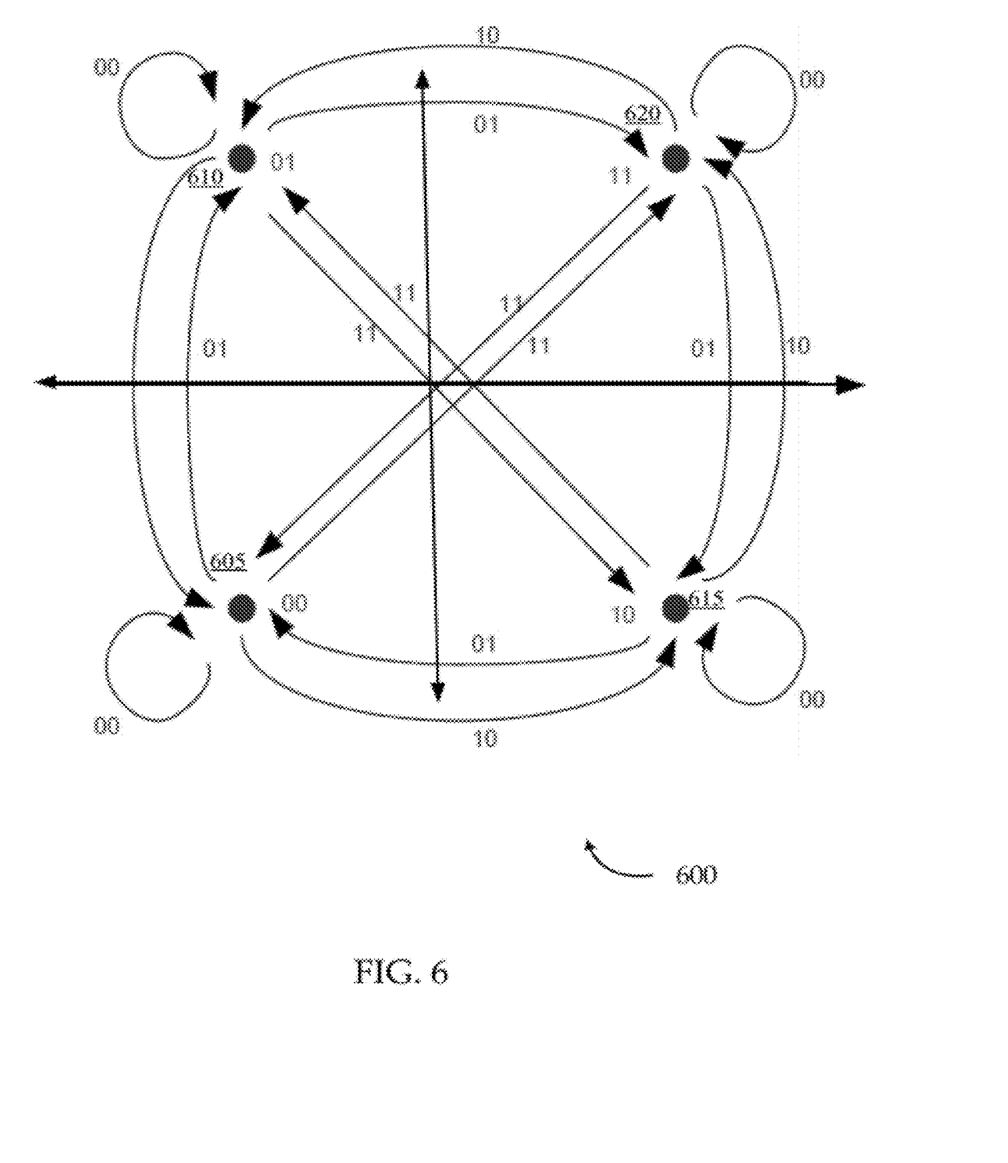
FIG. 6 is a diagram of a differential encoding and decoding scheme according to various embodiments of the invention.

While many embodiments have been introduced, some more specific examples of certain options and alternatives will now be provided. As alluded to above, the differential encoding (e.g., performed by the modulator module 215 of FIG. 2) may be applied with QPSK modulation separately in horizontal and vertical polarizations. FIG. 6 is a diagram 600 illustrating an example differential encoding scheme. For ease in description herein, (DI, DQ) may be used to represent the output differentially-encoded QPSK symbols from the differential decoder (e.g., differential decoder module 535). The transition between the constellation symbols are decided by the input symbols, (CI, CQ) to the differential encoder.

The differential encoder may follow these rules:
Initialization: assume the previous transmitted symbol pattern is 00 (ref. num. 605), so $(DI_{-1}, DQ_{-1})=(-0.707, -0.707)$
If the input symbol $(CI_0, CQ_0)$ to the differential decoder at time 0 is:
00 (ref. num. 605): no rotation is applied, $(DI_0, DQ_0)=(-0.707, -0.707)$.
01 (ref. num. 610): 90-degree clockwise rotation is applied, $(DI_0, DQ_0)=(-0.707, 0.707)$.
10 (ref num. 615): 90-degree counter-clockwise rotation is applied, $(DI_0, DQ_0)=(0.707, -0.707)$.
11 (ref. num. 620): 180-degree rotation is applied, $(DI_0, DQ_0)=(0.707, 0.707)$.
Let's assume the pattern for $(CI_0, CQ_0)$ is 10 (ref num. 120), so $(DI_0, DQ_0)=(0.707, -0.707)$. If the input symbol $(CI_1, CQ_1)$ to the differential decoder is:
00 (ref. num. 605): no rotation is applied, $(DI_1, DQ_1)=(0.707, -0.707)$.
01 (ref. num. 610): 90-degree clockwise rotation is applied, $(DI_1, DQ_1)=(-0.707, -0.707)$.
10 (ref num. 615): 90-degree counter-clockwise rotation is applied, $(DI_1, DQ_1)=(0.707, 0.707)$.
11 (ref. num. 620): 180-degree rotation is applied, $(DI_1, DQ_1)=(-0.707, 0.707)$.

And encoding may be performed continuously following this method. An example code for a differential encoder is given here:

```
DI[0]=CI[0];
DQ[0]=CQ[0];
for (i=1;i<sym_length;i++){
    fix= (DI[i-1]^ DQ[i-1]) & (CI[i]^ CQ[i]);
        DI[i]=(DI[i-1] ^ CQ[i]) ^ fix;
        DQ[i]=(DQ[i-1] ^ CQ[i]) ^ fix;
}
```

The differential decoding may be performed in each polarization after coherent QPSK detection. The hard decisions of $(CI_i, CQ_i)$ may be made based on judging the most likely transition between each pair of received symbols, $(DI_{i-1}, DQi_{-1})$ and $(DI_i, DQ_i)$ (e.g., noise corrupted at the receiver). The Table 1 below provides an example of a summary of the hard decision cases:

TABLE 1

Hard Decision Decoding

| Case index | $(DI_{i-1}, DQi_{-1})$ | $(DI_i, DQ_i)$ | $(CI_i, CQ_i)$ |
|---|---|---|---|
| 0 | 00 | 00 | 00 |
| 1 | 00 | 01 | 01 |
| 2 | 00 | 10 | 10 |
| 3 | 00 | 11 | 11 |
| 4 | 01 | 00 | 01 |
| 5 | 01 | 01 | 11 |
| 6 | 01 | 10 | 00 |
| 7 | 01 | 11 | 10 |
| 8 | 10 | 00 | 10 |
| 9 | 10 | 01 | 00 |
| 10 | 10 | 10 | 11 |
| 11 | 10 | 11 | 01 |
| 12 | 11 | 00 | 11 |
| 13 | 11 | 01 | 10 |
| 14 | 11 | 10 | 01 |
| 15 | 11 | 11 | 00 |

Example code to generate the hard decision is given here:

```
dspi=(DI[0]>=0);
dspq=(DQ[0]>=0);
for (i=1;i<symbol_length;i++){
    dsci=(DI[i]>=0);
    dscq=(DQ[i]>=0);
    fix= (dspi^dspq) & (!dsci^dscq);
    c1=(dspi^dsci) fix;
    c2=(dspq^dscq) fix;
    dspi=dsci; dspq=dscq;
}
```

To achieve the desired performance from the downstream TPC decoder, soft input information that represents the reliability of each bit may be calculated. One method to generate the soft input is to generate maximum likelihood ratio (e.g., LLR) as the input to the decoder. The general equation for LLR is:

$$LLR_{b_{i_i}} = \frac{\sum P(b_i = 1)}{\sum P(b_i = 0)} \quad \text{Eq. 1}$$

For example, for the bit CI, cases 2, 3, 5, 7, 8, 10, 12, and 13 in Table 1 are corresponding to a hard decision of $CI_i=1$, and the rest of the cases are corresponding to a hard decision of $CI_i=0$. So, $$LLR_{CI_i} = \frac{\begin{array}{l}P(00, 10) + P(00, 11) + P(01, 01) + P(01, 11) + \\ P(10, 00) + P(10, 10) + P(11, 00) + P(11, 01)\end{array}}{\begin{array}{l}P(00, 00) + P(00, 01) + P(01, 00) + P(01, 10) + P \\ (10, 01) + P(10, 11) + P(11, 10) + P(11, 11)\end{array}} \quad \text{Eq. 2}$$

Figure 7:
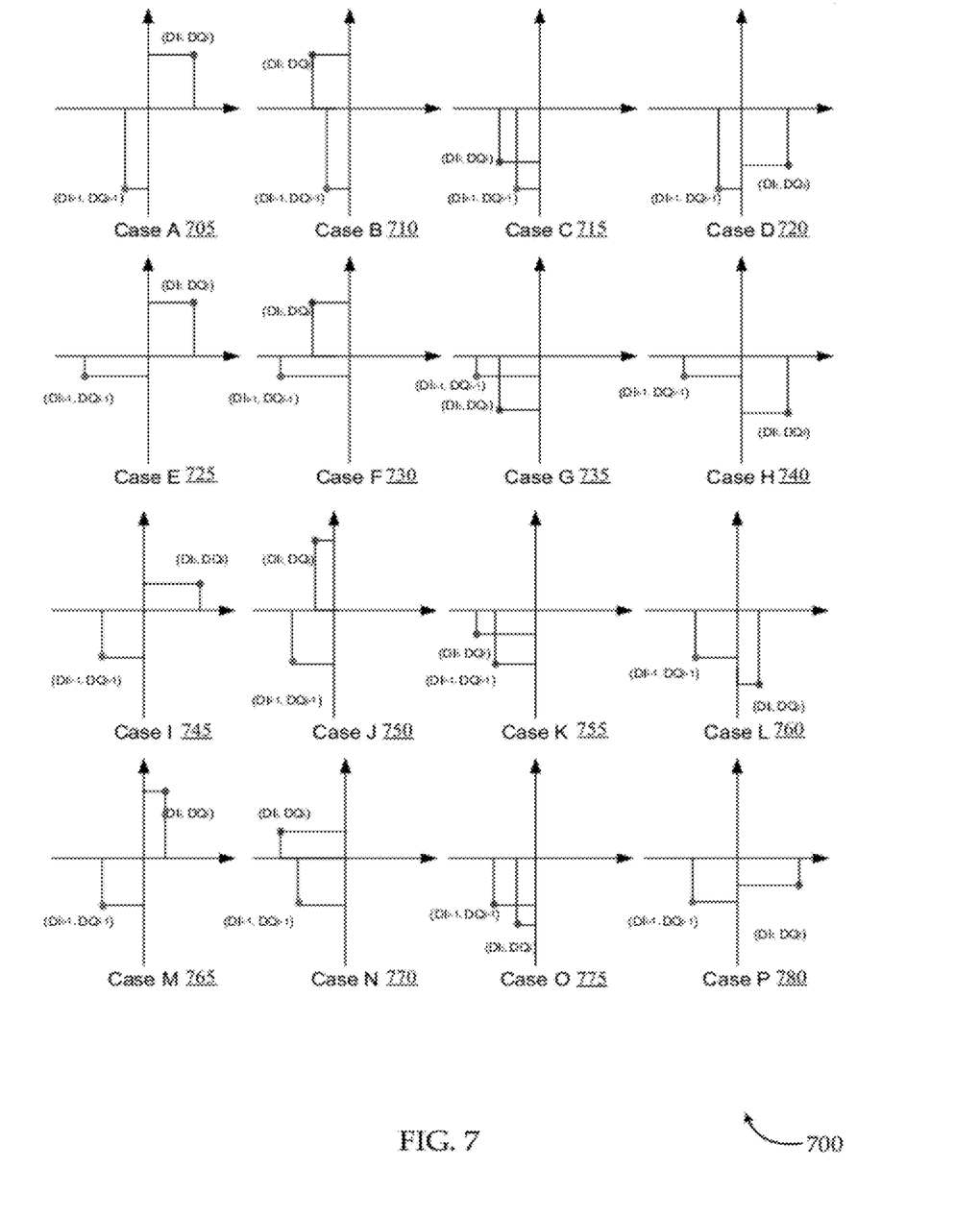
FIG. 7 is a diagram of a differential decoding case analysis according to various embodiments of the invention.

Here $P((DI_{i-1}, DQi_{-1}), (DI_i, DQi))$ represent the probability of a transition from $(DI_{i-1}, DQ_{i-1})$ to $(DI_i, DQ_i)$. A total of 16 terms are involved in the computation, so the computational complexity is high. However, this may be simplified using the analysis below. One aspect of the simplified algorithm is to identify the dominating terms in computing the LLR. The cases A-P illustrated in FIG. 7 showing differentially encoded QPSK output representations 700 may be used to help identify the dominating terms. To help identify the cases, for this example assume $(DI_{i-1}, DQ_{i-1})$ is always in the third quadrant, and $(DI_i, DQ_i)$ is moving from $1^{st}$ quadrant to $4^{th}$ quadrant in each row. In row 1, $DI_{i-1}$ has the smallest magnitude for case A 705, case B 710, case C 715, and case D 720. In row 2, $DQ_{i-1}$ has the smallest magnitude for case E 725, case F 730, case G 735, and case H 740. In row three, $DQ_i$ has the smallest magnitude in the first quadrant for case I 745 and is rotated by 90, 180 and 270 degrees for case J 750, case K 755, and case L 760. In row 4, $DI_i$ has the smallest magnitude in the first quadrant for case I 765 and is rotated by 90, 180 and 270 degrees for case N 770, case O 775, and case P 780. All these 16 cases combined cover all relative magnitude possibilities with $(DI_{i-1}, DQ_{i-1})$ in the $3^{rd}$ quadrant. By examining the cases, it can be determined what is the most likely transition (represented by $(CI_i, CQ_i)$) and what is the second likely transition. These two transitions may then be used to decide how the LLR information for $(CI_i, CQ_i)$ shall be collected.

For example, for case A 705, the most likely transition is $(CI_i, CQ_i)=11$ (transition from $(DI_{i-1}, DQi_{-1})=00$ to $(DI_i, DQi)=11$). Since $DI_{i-1}$ has the smallest magnitude among all, the second most likely transition is $(CI_i, CQ_i)=10$ (from $(DI_{i-1}, DQ_{i-1})=10$ to $(DI_i, DQi)=11$ with $DI_{i-1}$ flipped sign). The reliabilities of $(CI_i, CQ_i)$ are decided by both $(DI_{i-1}, DQ_{i-1})$ and $(DI_i, DQ_i)$. The G operation, which computes the joint reliability of two reliability values, is used to calculate the reliability of $CI_i$ and $CQ_i$. In this example the G operation between $(DI_{i-1}, DI_i)$ should be assigned to $CQ_i$ as the reliability information. The G operation between $(DQ_{i-1}, DQ_i)$ should be assigned to CI, as the reliability information.

In the example of case B 710, the most likely transition is $(CI_i, CQ_i)=01$ (transition from $(DI_{i-1}, DQ_{i-1})=00$ to $(DI_i, DQ_i)=01$). Since $DI_{i-1}$ has the smallest magnitude among all, the second most likely transition is $(CI_i, CQ_i)=11$ (from $(DI_{i-1}, DQ_{i-1})=10$ to $(DI_i, DQi)=01$ with $DI_{i-1}$ flipped sign). In this case the G operation between $(DI_{i-1}, DI_i)$ should be assigned to $CI_i$, as the reliability information since the flip of $CI_i$ is most likely event. On the other hand, the G operation between $(DQ_{i-1}, DQ_i)$ should be assigned to $CQ_i$ as the reliability information.

By analyzing all 16 cases, four of the cases: case A 705, case C 715, case E 725, and case G 735 shall have the G operation between $(DI_{i-1}, DI_i)$ assigned to $CQ_i$ and the G operation between $(DQ_{i-1}, DQ_i)$ assigned to CI, while in all other cases, the G operation between $(DI_{i-1}, DI_i)$ should be assigned to CI, and the G operation between $(DQ_{i-1}, DQ_i)$ should be assigned to $CQ_i$. This is summarized in Table 2:

TABLE 2

Reliability assignment for differential decoder

| Case index | Most likely transition $(DI_i, DQ_i)$ | Second most likely transition $(DI_i, DQ_i)$ | Reliability assignment $CI_i$ | Reliability assignment $CQ_i$ |
|---|---|---|---|---|
| A | 11 | 10 | $G(DQ_{i-1}, DQ_i)$ | $G(DI_{i-1}, DI_i)$ |
| B | 01 | 11 | $G(DI_{i-1}, DI_i)$ | $G(DQ_{i-1}, DQ_i)$ |
| C | 00 | 01 | $G(DQ_{i-1}, DQ_i)$ | $G(DI_{i-1}, DI_i)$ |
| D | 10 | 00 | $G(DI_{i-1}, DI_i)$ | $G(DQ_{i-1}, DQ_i)$ |
| E | 11 | 01 | $G(DQ_{i-1}, DQ_i)$ | $G(DI_{i-1}, DI_i)$ |
| F | 01 | 00 | $G(DI_{i-1}, DI_i)$ | $G(DQ_{i-1}, DQ_i)$ |
| G | 00 | 10 | $G(DQ_{i-1}, DQ_i)$ | $G(DI_{i-1}, DI_i)$ |
| H | 10 | 11 | $G(DI_{i-1}, DI_i)$ | $G(DQ_{i-1}, DQ_i)$ |
| I | 10 | 11 | $G(DI_{i-1}, DI_i)$ | $G(DQ_{i-1}, DQ_i)$ |
| J | 01 | 11 | $G(DI_{i-1}, DI_i)$ | $G(DQ_{i-1}, DQ_i)$ |
| K | 00 | 01 | $G(DI_{i-1}, DI_i)$ | $G(DQ_{i-1}, DQ_i)$ |
| L | 10 | 00 | $G(DI_{i-1}, DI_i)$ | $G(DQ_{i-1}, DQ_i)$ |
| M | 11 | 01 | $G(DI_{i-1}, DI_i)$ | $G(DQ_{i-1}, DQ_i)$ |
| N | 01 | 00 | $G(DI_{i-1}, DI_i)$ | $G(DQ_{i-1}, DQ_i)$ |
| O | 00 | 10 | $G(DI_{i-1}, DI_i)$ | $G(DQ_{i-1}, DQ_i)$ |
| P | 10 | 11 | $G(DI_{i-1}, DI_i)$ | $G(DQ_{i-1}, DQ_i)$ |

The above analysis covers only the cases when $(DI_{i-1}, DQ_{i-1})$ is in the third quadrant. The 16 other cases with $(DI_{i-1},$ $DQ_{i-1}$) in each other quadrant may be analyzed. Once analyzed, a subset of these terms that are the dominating terms for the calculation may be identified by evaluating relative magnitudes of in-phase and quadrature components of both input symbols involved in the transition, as set forth above.

The following is an example of C code which, including the hard decision code as shown before, may be used to decode all differential cases to generate near optimal soft input to the decoder.

```
//Initialization
dspi=(DI[0]>=0);
dspq=(DQ[0]>=0);
dmpi=abs(DI[0]);
dmpq=abs(DQ[0]);
for (i=1;i<symbol_length;i++){
    dsci=(DI[i])=0);
    dscq=(DQ[i]>=0);
    fix= (dspi^dspq) & (!dsci^dscq);
    c1=(dspi^dsci)^fix;
    c2=(dspq^dscq)^fix;
    fix2=(dspi^dspq);
    dmci=abs(DI[i]);
    dmcq=abs(DQ[i]);
    fix3=(min(dmpi,dmpq)<min(dmci,dmcq));
    fix2=fix2^(fix3 & (!((dspi^dspq) ^ (dsci^dscq))));
    //tp[2] is temp array to save the reliability information
    tp[ fix2]=G(dmpi, dmci);
    tp[!fix2]=G(dmpq, dmcq);
    //down from 6 bit to 4
    //truncation (not rounding) as required by the decoder
    Shift = 6-4;
    CI[i] = ((2*c1-1) * tp[0]) >> shift;
    CQ[i] = ((2*c2-1) * tp[1]) >> shift;
    dspi=dsci; dspq=dscq; dmpi=dmci; dmpq=dmcq;
}
```

Figure 8:
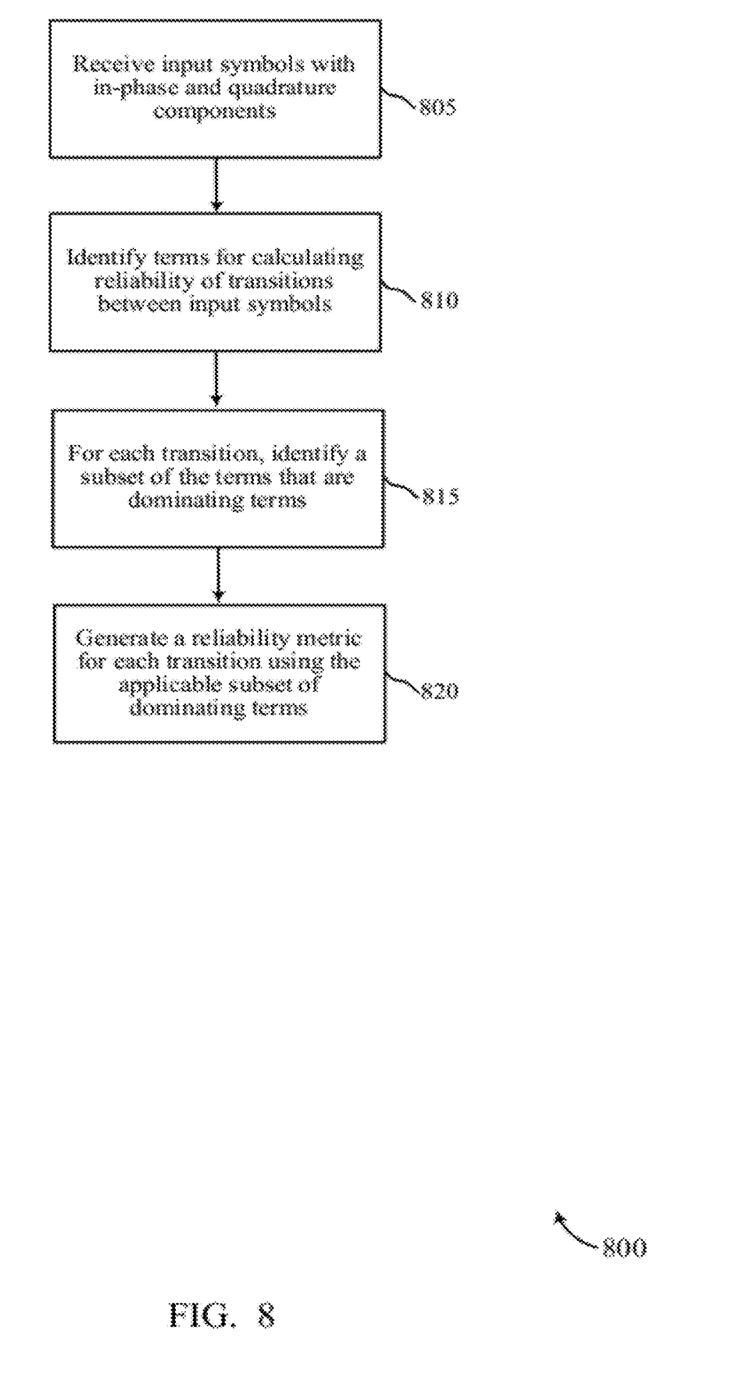
FIG. 8 is a flow chart of a method for soft-input generation for soft-decision FEC according to various embodiments of the invention.

FIG. 8 is a flow chart of a method 800 for soft-input generation for soft-decision FEC according to various embodiments of the invention. The method 800 may be performed by the digital demodulation and decoding unit 125 of FIG. 1 or 3. More specifically, the method 800 may be performed by the FEC decoder module 315 of FIG. 3 or 4.

At block 805, input symbols with in-phase and quadrature components are received. At block 810, terms for calculating the reliability of transitions between input symbols are identified. At block 815, a subset of the terms that are dominating terms are identified for each transition. At block 820, a reliability metric is generated for each transition using the applicable subset of dominating terms.

Figure 9:
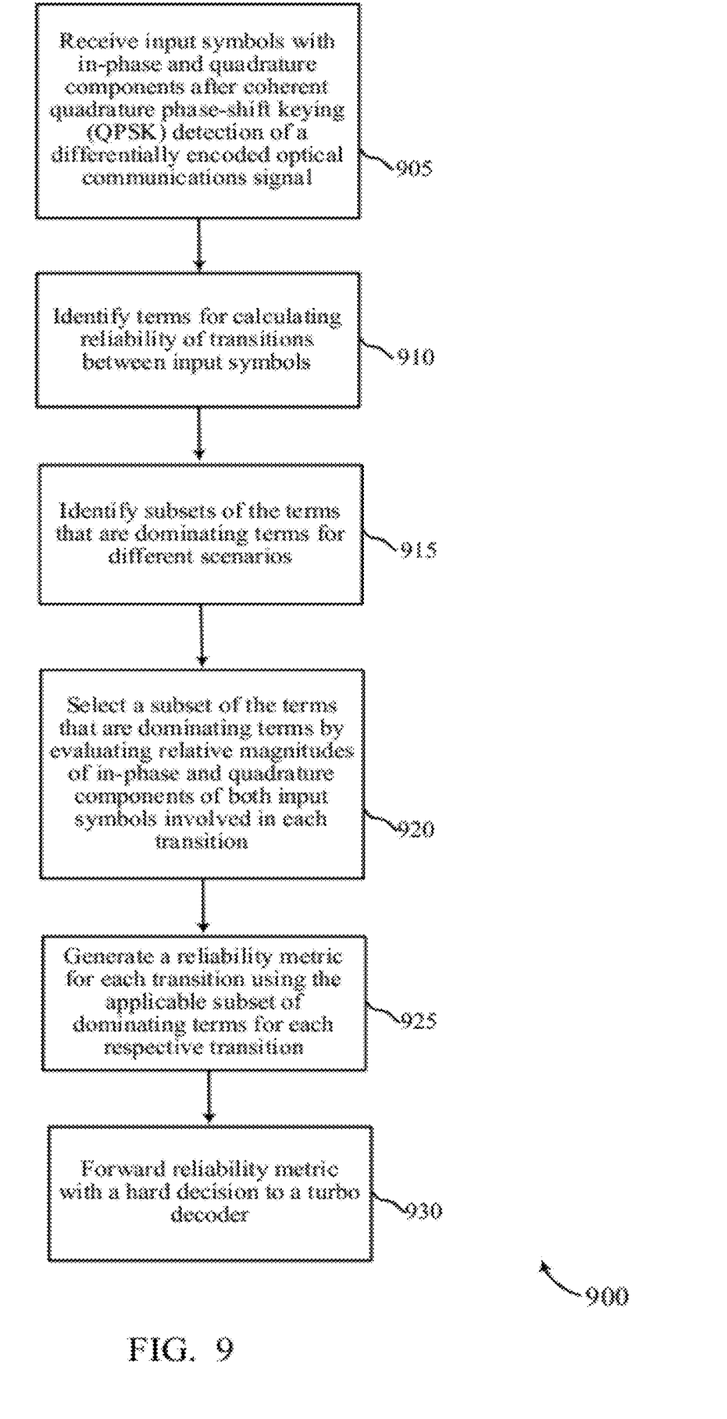
FIG. 9 is a flow chart of an alternative method for soft-input generation for soft-decision FEC according to various embodiments of the invention.

FIG. 9 is a flow chart of an alternative method 900 for soft-input generation for soft-decision FEC according to various embodiments of the invention. The method 900 may be performed by the digital demodulation and decoding unit 125 of FIG. 1 or 3. More specifically, the method 900 may be performed by the FEC decoder module 315 of FIG. 3 or 4.

At block 905, input symbols with in-phase and quadrature components are received after coherent QPSK detection of a differentially encoded optical communications signal. At block 910, terms are identified for calculating reliability of transitions between input symbols. At block 915, subsets of the terms that are dominating terms are identified for different scenarios. At block 920, a subset of the terms that are dominating terms are selected for each transition by evaluating relative magnitudes of in-phase and quadrature components of both input symbols involved. At block 925, a reliability metric is generated using the applicable subset of dominating terms for each respective transition. At block 930, the reliability metric and hard decision are forwarded to a turbo decoder.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" may represent one or more devices for storing data, including read-only memory (ROM), random access memory (RAM), magnetic RAM, core memory, magnetic disk storage mediums, optical storage mediums, flash memory devices or other computer-readable mediums for storing information. The term "computer-readable medium" includes, but is not limited to, portable or fixed storage devices, optical storage devices, wireless channels, a sim card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for soft decision differential decoding, the method comprising:

receiving a plurality of input symbols each comprising in-phase and quadrature components;

identifying a plurality of probability of transition terms for calculating reliability of transitions between the input symbols;

for each transition, identifying a subset of the plurality of probability of transition terms comprising dominating probability of transition terms; and generating a reliability metric for each transition using the applicable subset of dominating probability of transition terms for each respective transition.

2. The method of claim 1, wherein the reliability metric comprises a maximum likelihood ratio calculation.

3. The method of claim 1, further comprising:
selecting the subset of the plurality of terms comprising dominating probability of transition terms by evaluating relative magnitudes of in-phase and quadrature components of both input symbols involved in the transition.

4. The method of claim 1, further comprising:
selecting the subset of the plurality of probability of transition terms comprising dominating probability of transition terms by identifying a smallest magnitude of: an in-phase component of a first input symbol involved in transition, a quadrature component of the first input symbol involved in a transition, an in-phase component of a second input symbol involved in transition, and a quadrature component of the second input symbol involved in a transition.

5. The method of claim 1, wherein the identification of the subset of the plurality of probability of transition terms comprising dominating probability of transition terms is performed in real time.

6. The method of claim 1, wherein each of the plurality of input symbols is received after coherent quadrature phase-shift keying (QPSK) detection.

7. The method of claim 1, wherein each of the plurality of input symbols comprises an in-phase and a quadrature component, each input symbol received from a demodulator.

8. The method of claim 1, wherein the method for soft decision differential decoding is performed for each polarization of a dual polarization signal.

9. The method of claim 1, wherein the received plurality of input symbols comprises a digitized version of a received optical communications signal.

10. The method of claim 1, wherein the received plurality of input symbols comprises a digitized version of a received satellite communications signal.

11. The method of claim 1, further comprising:
forwarding the generated reliability metric to a decoder.

12. The method of claim 11, wherein the decoder comprises a turbo decoder.

13. The method of claim 11, further comprising:
generating a hard decision for each transition; and
forwarding the hard decision with the reliability metric to the decoder.

14. The method of claim 1, wherein the method is performed by a processor.

15. A system for soft decision differential decoding, the system comprising:
means for receiving a plurality of input symbols, each comprising in-phase and quadrature components;
means for identifying a plurality of probability of transition terms for calculating reliability of transitions between input symbols;
means for identifying, for each transition, a subset of the plurality of probability of transition terms comprising dominating probability of transition terms; and
means for generating a reliability metric for each transition using the applicable subset of dominating probability of transition terms for each respective transition.

16. The system of claim 15, wherein the reliability metric comprises a maximum likelihood ratio calculation.

17. The system of claim 15, further comprising:
means for selecting the subset of the plurality of probability of transition terms comprising dominating probability of transition terms by using relative magnitudes of in-phase and quadrature components of both input symbols involved in the transition to select dominant terms according a predetermined criteria.

18. The system of claim 15, wherein the identification of the subset of the plurality of probability of transition terms comprising dominating probability of transition terms is performed in real time after coherent quadrature phase-shift keying (QPSK) detection.

19. The system of claim 15, wherein the soft decision differential decoding is performed for each polarization of a dual polarization signal.

20. The system of claim 15, wherein the received plurality of input symbols comprises a digitized version of a received optical communications signal or received wireless communications signal.

21. The system of claim 15, further comprising:
means for forwarding the generated reliability metric to a decoder.

22. The system of claim 15, further comprising:
means for generating a hard decision for each transition;
means for forwarding the hard decision with the reliability metric to the decoder; and
means for decoding the received plurality of input symbols using the hard decision and the reliability metric for each transition.

23. A device for soft decision differential decoding, the method comprising:
a receiver module configured to receive a plurality of input symbols each comprising in-phase and quadrature components;
dominating term identification module, communicatively coupled with the receiver module, and configured to:
identify a plurality of probability of transition terms for calculating reliability of transitions between input symbols; and
for each transition, identify a subset of the plurality of probability of transition terms comprising dominating probability of transition terms; and
reliability metric generation module, communicatively coupled with the dominating term identification module, and configured to generate a reliability metric for each transition using the applicable subset of dominating probability of transition terms for each respective transition.

24. The device of claim 23, wherein the dominating term identification module is configured to:
select the subset of the plurality of probability of transition terms comprising dominating probability of transition terms by evaluating relative magnitudes of in-phase and quadrature components of both input symbols involved in the transition.

25. The device of claim 23, wherein the dominating term identification module is configured to:
select the subset of the plurality of probability of transition terms comprising dominating probability of transition terms in real time, wherein the selection is based in part on identifying a smallest magnitude of: an in-phase component of a first input symbol involved in transition, a quadrature component of the first input symbol involved in a transition, an in-phase component of a second input symbol involved in transition, and a quadrature component of the second input symbol involved in a transition.

26. The device of claim 23, wherein each of the plurality of input symbols comprises an in-phase and a quadrature component, each input symbol received from a demodulator after coherent quadrature phase-shift keying (QPSK) detection.

27. The device of claim 23, wherein the soft decision differential decoding is performed for each polarization of a dual polarization optical communications signal.

28. The device of claim 23, wherein the reliability metric generation module is configured to forward the generated reliability metric to a turbo decoder module.

29. The device of claim 23, further comprising:
   a hard decision module configured to:
      generate a hard decision for each transition; and
      forward the hard decision with the turbo decoder module; and
   the turbo decoder module, communicatively coupled with the hard decision module and the reliability metric generation module, and configured to decode the plurality of input symbols using the hard decision information and the generated reliability metrics.

30. The device of claim 23, wherein the device comprises a processor.

* * * * *